United States Patent
Valecha et al.

(10) Patent No.: US 11,240,226 B2
(45) Date of Patent: Feb. 1, 2022

(54) SYNCHRONOUS MULTI-TENANT SINGLE SIGN-ON CONFIGURATION (71) Applicant: INTERNATIONAL BUSINESS MACHINES CORPORATION, Armonk, NY (US)

(72) Inventors: Vinod A. Valecha, Pune (IN); Vivek Jain, Pune (IN); Deepak Rangnath Thorat, Pune (IN)

(73) Assignee: International Business Machines Corporation, Armonk, NY (US)

( * ) Notice: Subject to any disclaimer, the term of this patent is extended or adjusted under 35 U.S.C. 154(b) by 107 days.

(21) Appl. No.: 16/810,177

(22) Filed: Mar. 5, 2020

(65) Prior Publication Data
US 2021/0281559 A1 Sep. 9, 2021

(51) Int. Cl.
H04L 29/06 (2006.01)

(52) U.S. Cl.
CPC ...... H04L 63/0815 (2013.01); H04L 63/0853 (2013.01); H04L 63/0884 (2013.01)

(58) Field of Classification Search
CPC .......... H04L 63/0815; H04L 63/0884; H04L 63/0853; H04W 12/06; H04W 12/084; H04W 12/66
See application file for complete search history.

(56) References Cited

U.S. PATENT DOCUMENTS

| 7,530,099 | B2 | 5/2009 | Flurry | |
|---|---|---|---|---|
| 2007/0245414 | A1* | 10/2007 | Chan | H04L 9/3234 726/12 |
| 2011/0126272 | A1* | 5/2011 | Betzler | H04L 63/0815 726/6 |
| 2014/0013387 | A1 | 1/2014 | Vangpat | |
| 2014/0013409 | A1 | 1/2014 | Halageri | |

(Continued)

FOREIGN PATENT DOCUMENTS

| EP | 1283631 A2 | 2/2003 |
|---|---|---|
| EP | 2817733 B1 | 1/2015 |
| WO | 2013124752 A1 | 8/2013 |

OTHER PUBLICATIONS

Drath, et al., "Cloud based single sign on", IP.com, Nov. 7, 2013 [accessed on Nov. 8, 2019], IP.com No. IPCOM000232417D, Retrieved from the Internet: <URL: https://priorart.ip.com/IPCOM/000232417>.

(Continued)

*Primary Examiner* — Huan V Doan
(74) *Attorney, Agent, or Firm* — Nicholas A. Welling (57) ABSTRACT

A computer implemented method for synchronizing multi-tenant single sign-on configuration. Utilizing a combination layer that is configured a single time to interact with a trust application at an identity provider. The combination layer is also configured to interact with the service provider and manages the security token and authentication state of the user. The identity provider can create a single long-lived trust application that is only responsible for redirecting to the combination layer, rather than a creating plurality of short-lived applications that redirect to a service provider every time a user login request is received. Thus, resulting in improved utilization of computing resources at the identity provider.

20 Claims, 6 Drawing Sheets

(56) References Cited

U.S. PATENT DOCUMENTS

| | | | |
|---|---|---|---|
| 2014/0173711 A1* | 6/2014 | Zlatarev | H04L 63/0815 726/8 |
| 2014/0245389 A1* | 8/2014 | Oberheide | H04L 63/0884 726/3 |
| 2015/0319156 A1* | 11/2015 | Guccione | H04L 63/205 726/7 |
| 2018/0083967 A1 | 3/2018 | Subramanian | |
| 2019/0102534 A1 | 4/2019 | Elias | |
| 2020/0259817 A1* | 8/2020 | Natarajan | H04L 63/0815 |

OTHER PUBLICATIONS

Mell et al., "The NIST Definition of Cloud Computing", National Institute of Standards and Technology, Special Publication 800-145, Sep. 2011, 7 pages.

* cited by examiner

SYNCHRONOUS MULTI-TENANT SINGLE SIGN-ON CONFIGURATION

BACKGROUND

The invention relates generally to single sign-on methods, and more particularly to single sign-on methods of multi-tenant service providers.

Single sign-on methods allow a user to enter credentials into an identity provider one time and gain access to one or more resources located at a service provider. An identity provider is a system entity with a database containing information about users and the login credentials of the users. A service provider is a system entity that possesses a resource which a user is attempting to access.

In many cases, the service provider delegates the authentication of users to the identity provider. This is because it reduces the burden on a user because there is no need to remember numerous passwords to access the desired resources. Further, single sign-on methods are beneficial for many service providers because the service provider is not required to maintain a database with user credentials and potentially sensitive personally identifiable information.

Many cloud based systems are multi-tenant systems. A multi-tenant system allows many different tenants to have access to a single instance of software on a public cloud system. While there may be many different tenants on a single cloud, the resources and data specific to a tenant may only be accessed by the tenants and are separated by dictated permission settings. Single sign-on methods allow for one or more trusted identity providers to authenticate and provide credentials for users, which in turn allows the service provider to grant access to the resources to which the user has permission.

SUMMARY

According to one aspect of the present invention, a computer-implemented method for synchronizing multi-tenant single sign-on at an identity provider (IDP), the method comprising: requesting, by one or more processors, the creation of a trust application configured with a security protocol at the IDP, by a combination layer; and receiving, by the one or more processors, at the combination layer verification of the creation of the trust application at an IDP.

According to another aspect of the present invention, a computer-implemented method for synchronizing multi-tenant single sign-on at an IDP, the method comprising: requesting, by one or more processors, access to a tenant resource at a service provider by a user via a security protocol; creating, by the one or more processors, a user state; storing, by the one or more processors, the user state; transmitting, by the one or more processors, the user state to a combination layer; transmitting, by the one or more processors, the user state from combination layer to a trust application at an IDP; validating, by the one or more processors, the user state information at the IDP; and responsive to valid user credentials, authenticate the user by creating, by the one or more processors, a user token at the IDP; transmitting, by the one or more processors, the user token to the combination layer; transmitting, by the one or more processors, the user token and the user state to SP; validating, by the one or more processors, the user state and the user token at SP, retrieving, by the one or more processors, a user profile at SP that corresponds to the user state; and granting, by the one or more processors, access to the requested tenant resource at SP.

According to another aspect of the present invention, a computer system for synchronizing multi-tenant single sign-on at an IDP, the computer system comprising: one or more computer processors; one or more non-transitory computer readable storage media; program instructions stored on the one or more non-transitory computer readable storage media for execution by at least one of the one or more computer processors, the program instructions comprising: program instructions to request the creation of a trust application at the IDP by a combination layer program instructions to create the trust application at the IDP, configured to receive single sign-on authentication requests from the combination layer according to a security protocol; responsive to the successful creation of the trust application, program instructions to transmit confirmation of the trust application creation from the IDP to the combination layer; program instructions to create a tenant domain at a service provider, configured to accept authentication credentials according to the security protocol from the combination layer; and program instructions to configure the combination layer to redirect successfully authenticated single sign-on session from the IDP.

DETAILED DESCRIPTION

It should be noted that embodiments of the present invention are described with reference to different embodiments. In particular, some embodiments are described with reference to method-type claims. However, a person of ordinary skill in the art will gather from the above and the following description that, unless otherwise noted, in addition to any combination of features belonging to one embodiment, any combination of features relating to different embodiments, in particular, features of the method type claims, systems claims, and computer product claims are considered to be disclosed within this document.

The aspects defined above, and further aspects of embodiments of the present invention, are apparent from the examples of embodiments to be described hereinafter and are explained with reference to examples of the embodiments, but to which the invention is not limited.

In the following, additional embodiments, applicable to the method, computer program product as well as to the related system, will be described.

In an embodiment of the present invention, there can be a combination layer (CL) configured to reduce the number of single sign-on (SSO) applications at an identity provider (IDP). A service provider (SP) can direct a user login request to the combination layer, which can be configured to accept the login credentials of the user and redirect the credentials to the IDP. The IDP can authenticate the user's credentials with a trust application which, if successfully authenticated, redirects an authentication state and security token to the CL. A trust application can be a long-lived SSO instance that redirects successful authentication requests to the CL. The CL can forward an authentication state and a security token to the SP. Once authenticated, the SP can grant the user access to the resources for which permissions have been granted. Further, the CL is only required to be created one-time and initialized for an IDP, thus enabling the synchronous multi-tenant sign-on at an IDP.

Embodiments of the present invention can be implemented together with virtually any type of computer, regardless of the platform, being suitable for storing and/or executing program code.

Figure 1:
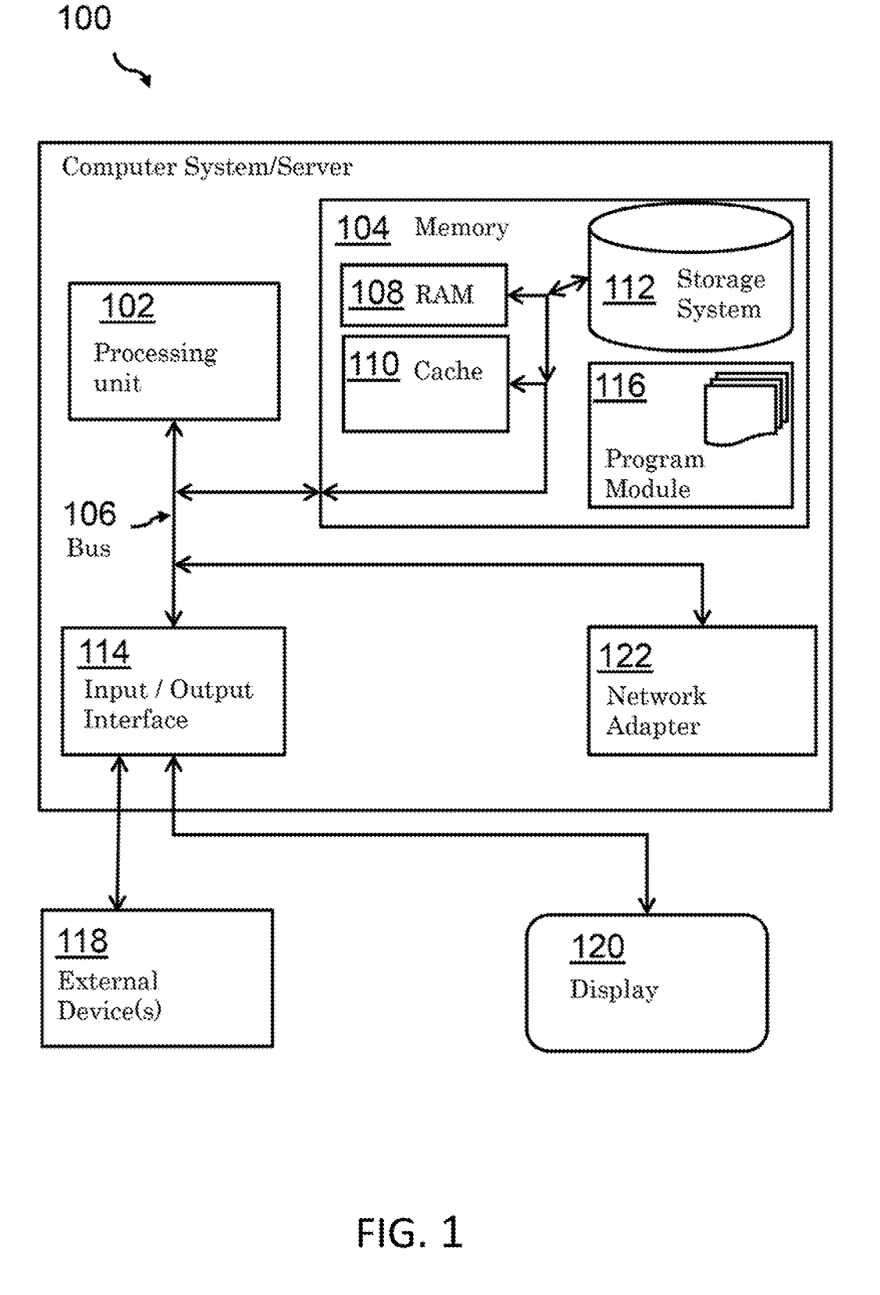
FIG. 1 is a block diagram depicting components of a computer, generally designated 100, suitable for operation of a synchronous multi-tenant single sign-on configuration, in accordance with an embodiment of the present invention.

FIG. 1 shows, as an example, a computing system 100 suitable for executing program code related to the proposed embodiments.

The computing system 100 is only one example of a suitable computer system and is not intended to suggest any limitation as to the scope of use or functionality of embodiments of the invention described herein, regardless, whether the computer system 100 is capable of being implemented and/or performing any of the functionality set forth hereinabove. In the computer system 100, there are components, which are operational with numerous other general purpose or special purpose computing system environments or configurations. Examples of well-known computing systems, environments, and/or configurations that may be suitable for use with computer system/server 100 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 100 may be described in the general context of computer system-executable instructions, such as program modules, being executed by a computer system 100. Generally, program modules may include routines, programs, objects, components, logic, data structures, and so on that perform particular tasks or implement particular abstract data types. Computer system/server 100 may be practiced in distributed cloud computing environments where tasks are performed by remote processing devices that are linked through a communications network. In a distributed cloud computing environment, program modules may be located in both, local and remote computer system storage media, including memory storage devices.

As shown in the FIG. 1, computer system/server 100 is shown in the form of a general-purpose computing device. The components of computer system/server 100 may include, but are not limited to, one or more processors or processing units 102, a system memory 104, and a bus 106 that couple various system components including system memory 104 to the processor 102. Bus 106 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 100 typically includes a variety of computer system readable media. Such media may be any available media that is accessible by computer system/server 100, and it includes both, volatile and non-volatile media, removable and non-removable media.

The system memory 104 may include computer system readable media in the form of volatile memory, such as random-access memory (RAM) 108 and/or cache memory 110. Computer system/server 100 may further include other removable/non-removable, volatile/non-volatile computer system storage media. By way of example only, a storage system 112 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as, but not limited to, a CD-ROM, DVD-ROM or other optical media may be provided. In such instances, each can be connected to bus 106 by one or more data media interfaces. As will be further depicted and described below, memory 104 may include at least one program product having a set (e.g., at least one) of program modules that are configured to carry out the functions of embodiments of the invention.

The program/utility, having a set (at least one) of program modules 116, may be stored in memory 104 by way of example, and not limiting, as well as an operating system, one or more application programs, other program modules, and program data. Each of the operating systems, one or more application programs, other program modules, and program data or some combination thereof, may include an implementation of a networking environment. Program modules 116 generally carry out the functions and/or methodologies of embodiments of the invention, as described herein.

The computer system/server 100 may also communicate with one or more external devices 118 such as a keyboard, a pointing device, a display 120, etc.; one or more devices that enable a user to interact with computer system/server 100; and/or any devices (e.g., network card, modem, etc.) that enable computer system/server 100 to communicate with one or more other computing devices. Such communication can occur via Input/Output (I/O) interfaces 114. Still yet, computer system/server 100 may communicate with one or more networks such as a local area network (LAN), a general wide area network (WAN), and/or a public network (e.g., the Internet) via network adapter 122. As depicted, network adapter 122 may communicate with the other components of the computer system/server 100 via bus 106. It should be understood that, although not shown, other hardware and/or software components could be used in conjunction with computer system/server 100. Examples, include, but are not limited to: microcode, device drivers, redundant processing units, external disk drive arrays, RAID systems, tape drives, and data archival storage systems, etc.

The descriptions of the various embodiments of the present invention have been presented for purposes of illustration but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of embodiments of the present invention.

The medium may be an electronic, magnetic, optical, electromagnetic, infrared or a semi-conductor system for a propagation medium. Examples of a computer-readable medium may include a semi-conductor or solid-state memory, magnetic tape, a removable computer diskette, a random-access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

Figure 2:
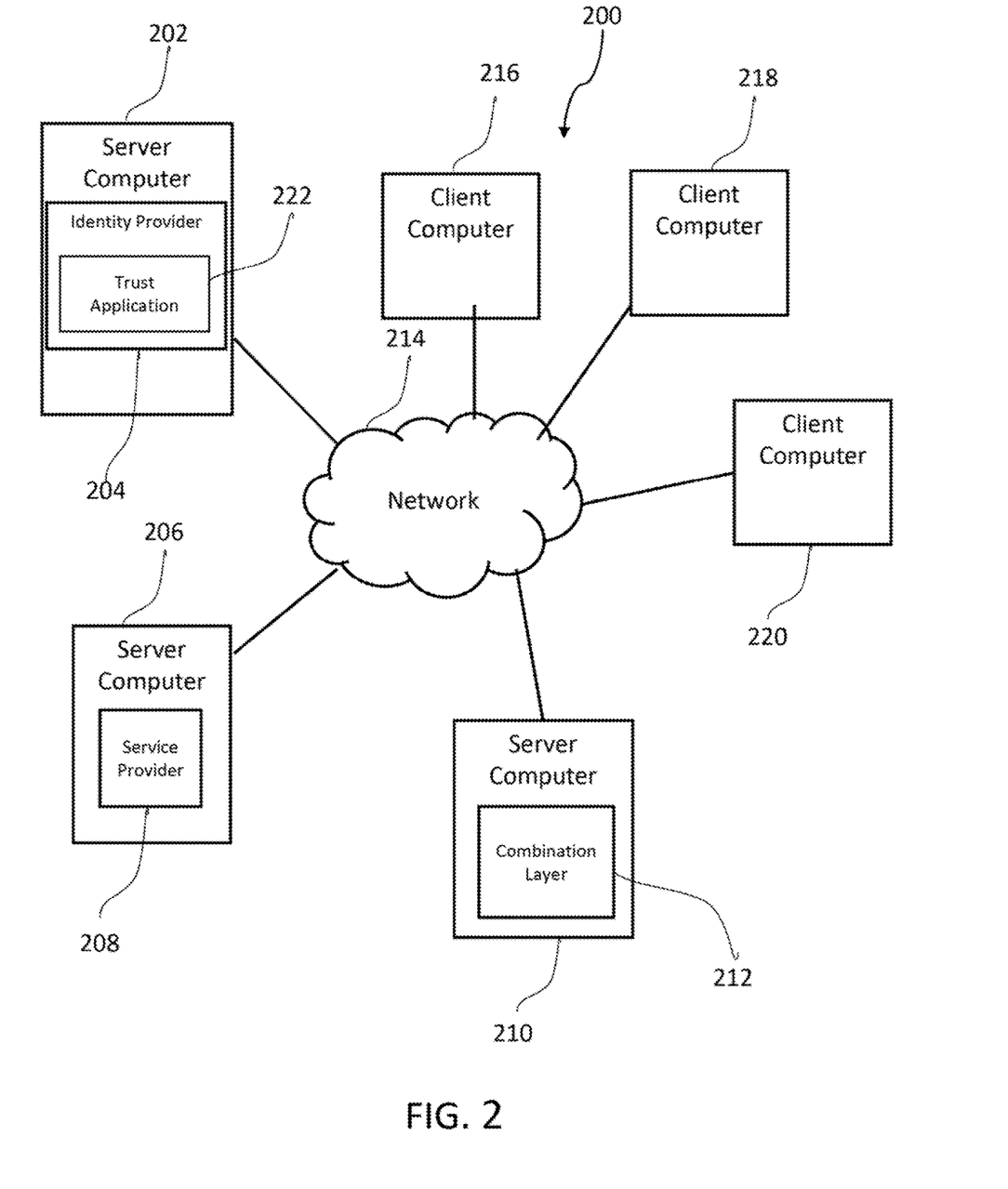
FIG. 2 is a block diagram of an exemplary environment suitable for operation of a synchronous multi-tenant single sign-on configuration, in accordance with an embodiment of the present invention.

FIG. 2 is an exemplary environment 200 suitable for an embodiment for synchronizing multi-tenant single sign-on configuration. The synchronous multi-tenant single sign-on configuration environment 200 comprises a server computer 202 which operates the m IDP 204, a server computer 206 which operates the SP 208, a server computer 210 which operates the combination layer CL 212, a network 214, and client computers 216, 218, and 220. It should be noted, an embodiment can utilize at least one or a plurality of client computers, i.e. 1+n, where n can be any number of client computers.

In one embodiment, server computers 202, 206, and 210 can be a standalone computing device, management server, a web server, a mobile computing device, or any other electronic device or computing system capable of receiving, sending, and processing data. In other embodiments, server computers 202, 206, and 210 can represent a server computing system utilizing multiple computers as a server system. In another embodiment, server computers 202, 206 and 210 can be a laptop computer, a tablet computer, a netbook computer, a personal computer, a desktop computer, or any programmable electronic device capable of communicating with other computing devices (not shown).

In another embodiment, server computers 202, 206, and 210 represent a computing system utilizing clustered computers and components (e.g., database server computers, application server computers, etc.) that act as a single pool of seamless resources when accessed within the multi-tenant single sign-on synchronous configuration environment 200. It should be noted that server computers can include internal and external hardware components, as depicted in FIG. 1.

Server computer 202 further comprises IDP 204. IDP 204 can possess functionality that can authenticate users. IDP 204 may operate on a server computer 202 or any other suitable electronic device that is connected to network 214. IDPs may include but are not limited to Google Authenticator, Facebook Authenticator, Amazon Web Service SSO, or Salesforce Authenticator. The authentication of users can be accomplished with a single sign-on ("SSO") mechanism or any other mechanism that is suitable to authenticate a user including but not limited to, two-factor authentication or biometric authentication. In an embodiment of the invention, IDP 204 can have a database (not shown) which contains various information about users associated with a tenant. IDP 204 database may also contain information about users not associated with a specific tenant. The information in IDP 204 database may include, but is not limited to, name, employer, address, and login credentials. Further, the information stored in IDP 204 database may include information about a two-factor authentication method and how to utilize it. IDP 204 may include trust application 220, i.e. a SSO mechanism, that can be configured to operate in conjunction with CL 212 and redirect all successful authentication requests from CL 212 back to CL 212, rather than redirecting authenticated users back to different SPs. IDP 204 SSO mechanism can redirect the user back to the CL 212 after authentication. In order to show that a user has been authenticated, IDP 204 may transmit a user token and authentication state to CL 212. A user token may be a token, certificate, or any other suitable security measure capable of showing that a user has been authenticated. IDP 204 may operate on an SSO security protocol, including, but not limited to, Security Assertion Markup Language 2.0, OAuth 2.0, Open IDconnect, etc.

SP 208 can provide functionality a resource a user might want to utilize i.e., a tenant domain. A tenant domain can be an instance running on a cloud, however, the domain is partitioned off from any other tenants, so users of one tenant cannot access the data or features of other tenants. Examples of SPs can include but are not limited to, Salesforce, Workday, Sumo Logic. The single software application may be an application, database, or any service a user could access by network 214. Once a user accesses SP 208, SP 208 creates a user state and the user state is directed to CL 212. In some embodiments the user state can be the user's login information which can include but is not limited to, password, username, and IP address. It should be noted that SP 208 does not have the login credentials of the user and delegates the authentication to another entity, namely IDP 204.

CL 212 can provide functionality that accepts user login requests from multiple SPs 208 and direct the requests to IDP 204. CL 212 can be configured to operate in conjunction with trust application 220 at an IDP 204. A trust application is an SSO instance at IDP 204, where the instance is configured to trust authentication requests from CL 212. The trust application 220 can receive the authentication request from CL 212 and attempt to authenticate the user. If the authentication is successful, the trust application 220 can redirect the security token to CL 212 which can consist of a set of XML, data records which can identify the identity and group membership of the user requesting authentication, and authenticated state back to CL 212. Additionally, if IDP 204 operates under certain SSO security protocol, for example but not limited to, OAuth 2.0, OpenID, and Native Application Profile. CL 212 can provide the capability to transmit application programming interface instructions, as well as including access tokens and session keys from IDP 204 to SP 208.

Further, it should be noted that in FIG. 2 multiple servers 202, 206, and 210 are shown, each with different modules, IDP 204, SP 208, and CL 212, the modules can all be located on the same server or in any combination on different servers.

Client computer 216, 218, and 220 can be a standalone computing device, management server, a web server, a mobile computing device, or any other electronic device or computing system capable of receiving, sending, and processing data. In other embodiments, client computers 216, 218, and 220 can represent a server computing system utilizing multiple computers as a server system. In another embodiment, server computers 202, 206 and 210 can be a laptop computer, a tablet computer, a netbook computer, a personal computer, a desktop computer, or any programmable electronic device capable of communicating with other computing devices (not shown) within the multi-tenant single sign-on synchronous configuration environment 200 via network 214. Client computer 216, 218, and 220 possess the capability to access the SP 208 via a web browser (not shown), which then commences the login process.

Figure 3:
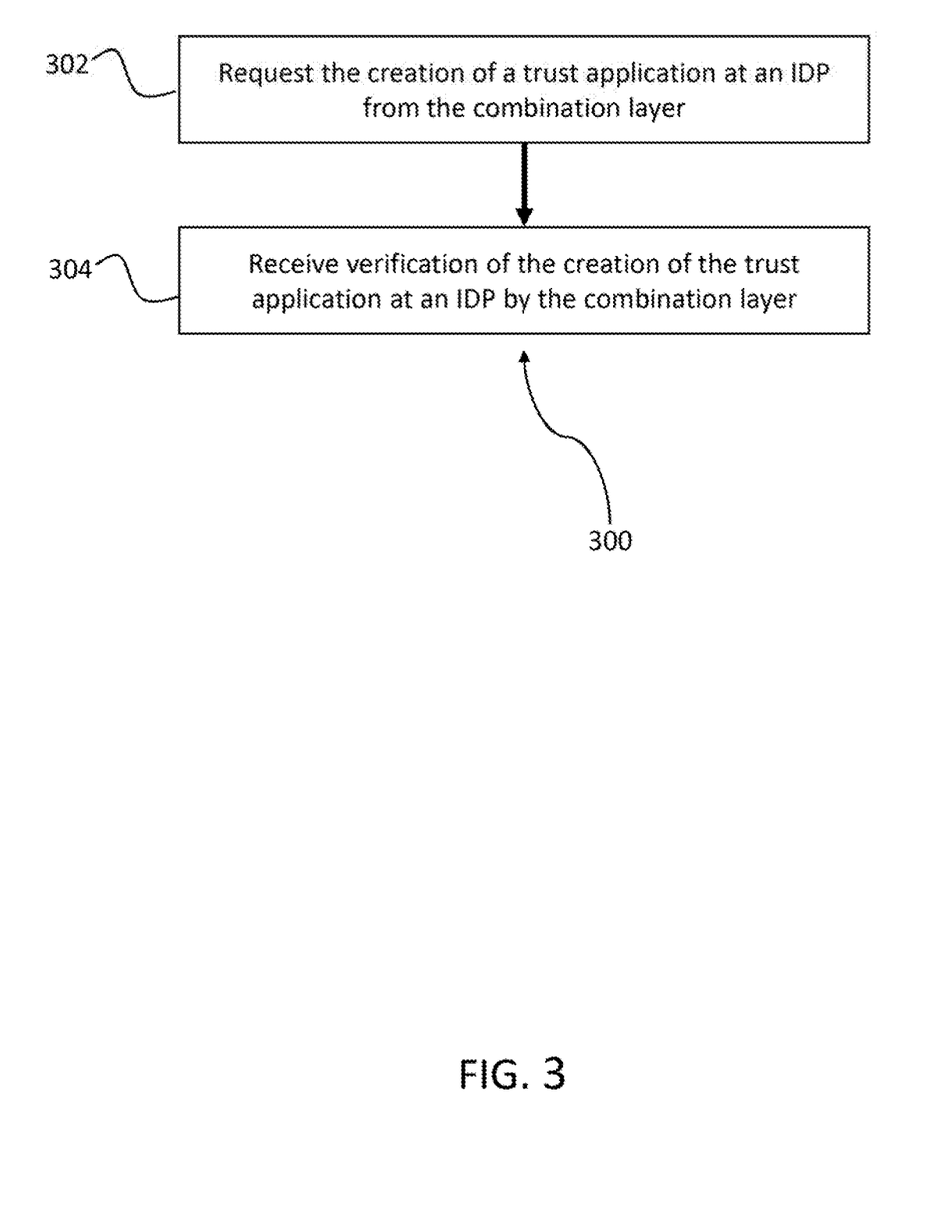
FIG. 3 is a flow chart diagram depicting a computer-implemented method for creating a synchronous multi-tenant single sign-on configuration, in accordance with an embodiment of the present invention.

FIG. 3 is a flow chart diagram depicting the operational steps of an embodiment of a computer-implemented method for synchronous multi-tenant single sign-on configuration 300. At step 302, CL 212 requests the creation of trust application 220 at IDP 204. Next at step 304, IDP 204 transmits confirmation of the creation of trust application 220 to CL 212 via network 214.

Figure 4:
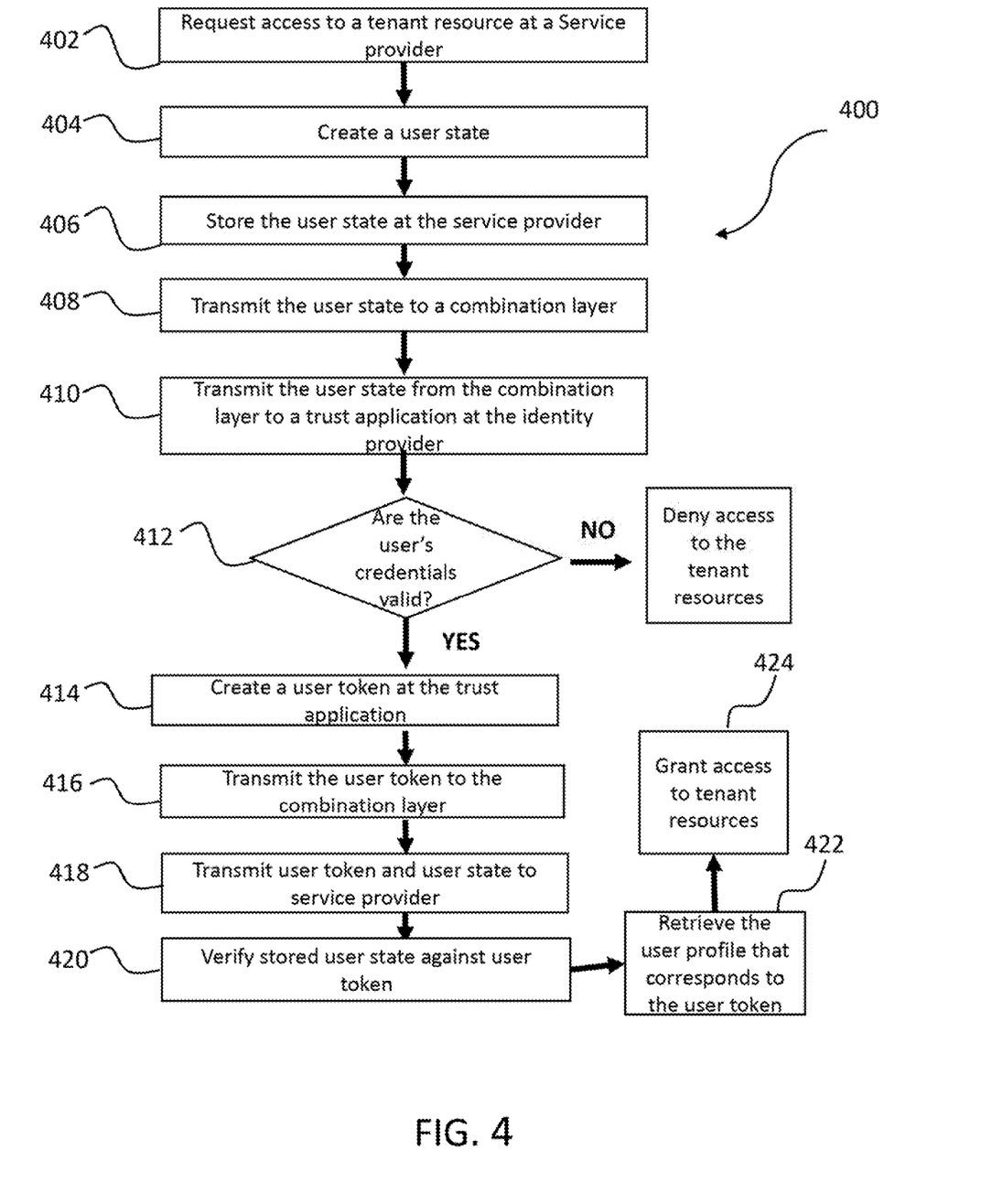
FIG. 4 is a flow chart diagram depicting a computer-implemented method of the operational steps for utilizing a multi-tenant single sign-on configuration, in accordance with an embodiment of the present invention.

FIG. 4 is a flow chart diagram depicting the operational steps of an embodiment of a computer-implemented method for utilizing a multi-tenant single sign-on configuration 400. At step 402, a user requests access to tenant resources at SP 208. Next at step 404, a user state is created at SP 208. Next at step 406, store the user state at SP 208. Next at step 408, transmit the user state to CL 212. Next, at step 410 transmit the user state to trust application 220 at IDP 204. Next, at step 412 determine at trust application 220 if the user's credentials are valid. If the credentials are not valid deny access. If the credentials are valid, go to step 414. At step 414, create a user token at trust application 220. Next at step 416, transmit the user token to CL 212. Next at step 418, transmit the user token to the CL 212. Next at step 420, verify the user state against the user token. Next at step 422, retrieve the user profile that corresponds to the user token. Next at step 424, grant the user access to the requested tenant resources.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
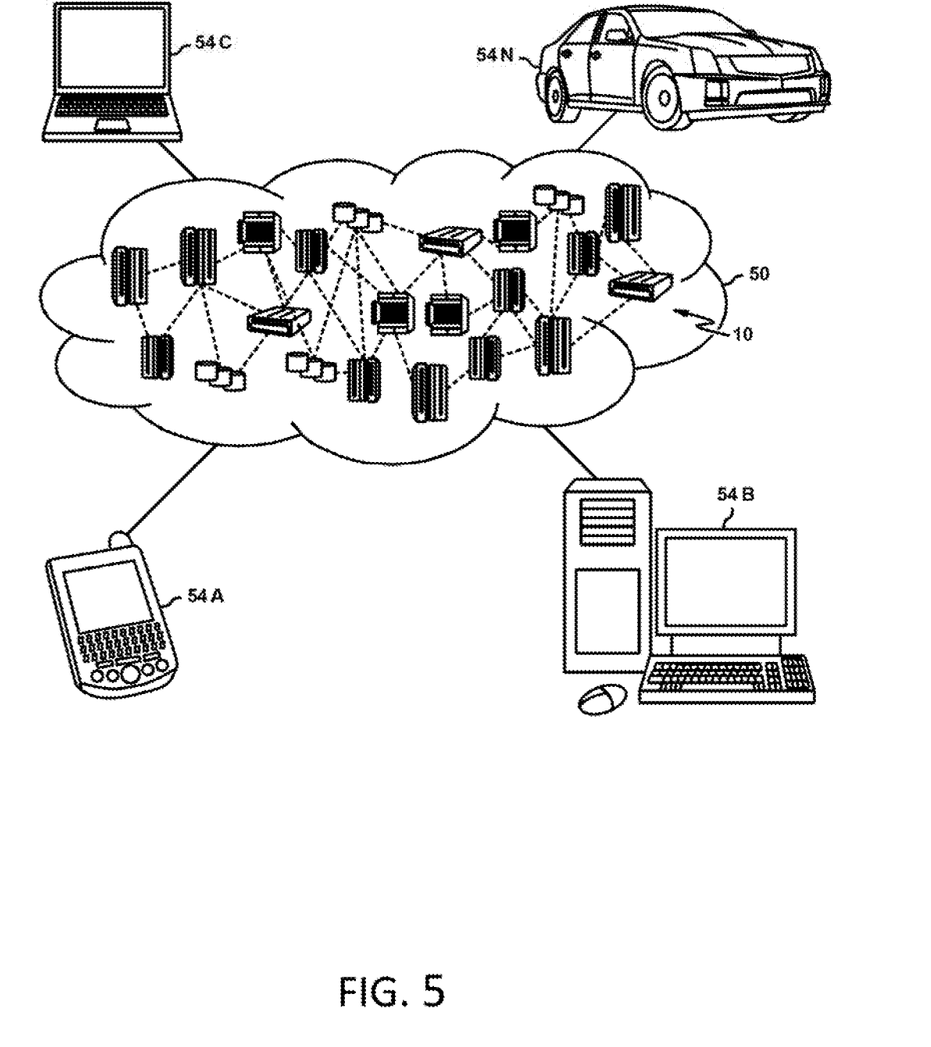
FIG. 5 is a block diagram depicting a cloud computing environment, in accordance with an embodiment of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
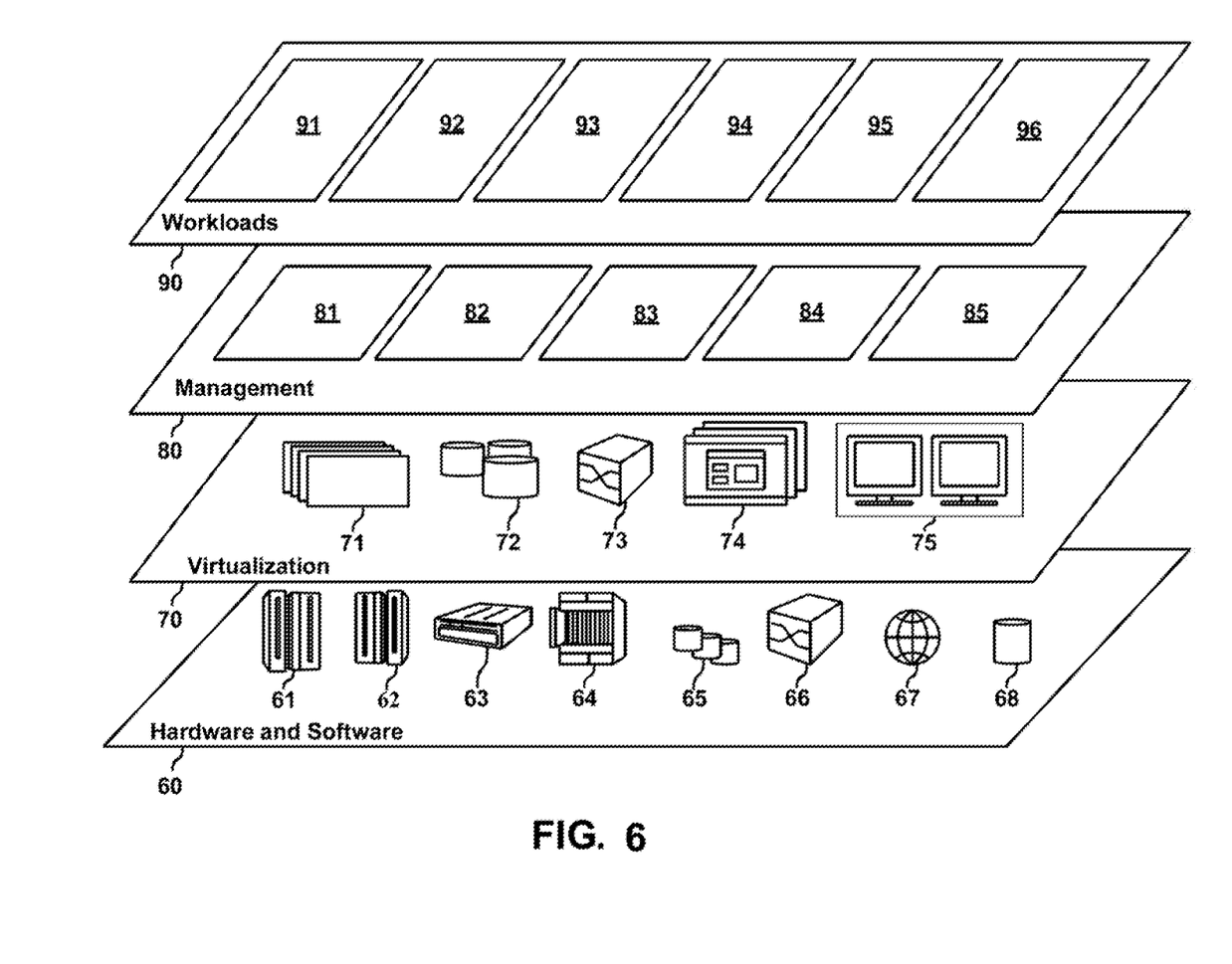
FIG. 6 is a block diagram depicting abstraction model layers, in accordance with an embodiment of the present invention.

Referring now to FIG. 6, a set of functional abstraction layers provided by cloud computing environment 50 (FIG. 1) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and synchronous multi-tenant single sign-on configuration 96.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

What is claimed is:

1. A computer-implemented method for synchronizing multi-tenant single sign-on at an identify provider (IDP), the method comprising:
   requesting, by one or more processors, access to a tenant resource at a service provider (SP) by a user via a security protocol;
   creating, by the one or more processors, a user state;
   storing, by the one or more processors, the user state;
   transmitting, by the one or more processors, the user state to a combination layer;
   transmitting, by the one or more processors, the user state from the combination layer to a trust application at the IDP;
   validating, by the one or more processors, the user state information at the IDP;
   responsive to valid user credentials, create, by the one or more processors, a user token at the IDP;
   transmitting, by the one or more processors, the user token to the combination layer;
   transmitting, by the one or more processors, the user token and the user state to the SP;
   validating, by the one or more processors, the user state and the user token at the SP;
   retrieving, by the one or more processors, a user profile at the SP that corresponds to the user state; and
   granting, by the one or more processors, access to the requested tenant resource at the SP.

2. The computer-implemented method of claim 1, wherein the security protocol of the single sign-on authentication request is Security Assertion Markup Language 2.0.

3. The computer-implemented method of claim 1 wherein the user's login request to access a tenant resource at the SP is from an application on a user's mobile device and the combination layer additionally acts as an application programming interface between the IDP and the SP.

4. The computer-implemented method of claim 3, wherein the security protocol of the single sign-on authentication request is OAuth 2.0.

5. The computer-implemented method of claim 3, wherein the security protocol of the single sign-on authentication request is OpenID Connect.

6. The computer-implemented method of claim 1, further comprising,
   requesting, by one or more processors, creation of a trust application configured with a security protocol at an IDP, by a combination layer; and
   receiving, by the one or more processors, at the combination layer, verification of creation of the trust application at the IDP.

7. The computer-implemented method of claim 1, wherein the trust application is configured to redirect a validated user authentication request, which originated the combination layer, back to the combination layer when the user credentials are validated.

8. A computer system for synchronizing multi-tenant single sign-on at an identify provider (IDP), the computer system comprising:
one or more computer processors;
one or more non-transitory computer readable storage media; and
program instructions stored on the one or more non-transitory computer readable storage media for execution by at least one of the one or more computer processors, the program instructions comprising:
program instructions to request access to a tenant resource at a service provider (SP) by a user;
program instructions to create a user state;
program instructions to store the user state;
program instructions to transmit the user state to a combination layer;
program instructions to transmit the user state from combination layer to a trust application at the IDP;
program instructions to validate the user state information at the IDP;
responsive to valid user credentials, program instructions to create a user token at the trust application;
program instructions to transmit the user token to the combination layer;
program instructions to transmit the user token and the user state to the SP;
program instructions to validate the user state and the user token at the SP;
program instructions to retrieve a user profile at the SP that corresponds to the user state; and
program instructions to grant access to the tenant resource at the SP.

9. The computer system of claim 8, further comprising:
program instructions to request creation of the trust application at the IDP by a combination layer;
program instructions to create the trust application at the IDP, configured to receive single sign-on authentication requests from the combination layer according to a security protocol;
responsive to the successful creation of the trust application, program instructions to transmit confirmation of the trust application creation from the IDP to the combination layer;
program instructions to create a tenant domain at a service provider, configured to accept authentication credentials according to the security protocol from the combination layer; and
program instructions to configure the combination layer to redirect successfully authenticated single sign-on session from the IDP.

10. The computer system of claim 8, wherein the security protocol of the single sign-on authentication request is Security Assertion Markup Language 2.0.

11. The computer system of claim 8, wherein the user's login request to access a tenant resource at the SP is from an application on a user's mobile device and the combination layer additionally acts as an Application Programming Interface between the IDP and the SP.

12. The computer system of claim 11, wherein the security protocol of the single sign-on authentication request is OAuth 2.0.

13. The computer system of claim 11, wherein the security protocol of the single sign-on authentication request is OpenID Connect.

14. The computer system of claim 8, further comprising:
program instructions to request creation of a trust application configured with a security protocol at an IDP, by a combination layer; and
program instructions to receive at the combination layer verification of creation of the trust application at the IDP.

15. A computer program product for synchronizing multi-tenant single sign-on at an identify provider (IDP), the computer program product comprising:
one or more non-transitory computer readable storage media and program instructions stored on the one or more computer readable storage media, the program instructions comprising:
program instructions to request access to a tenant resource at a service provider (SP) by a user;
program instructions to create a user state;
program instructions to store the user state;
program instructions to transmit the user state to a combination layer;
program instructions to transmit the user state from combination layer to a trust application at the IDP;
program instructions to validate the user state information at the IDP;
responsive to valid user credentials, program instructions to create a user token at the trust application;
program instructions to transmit the user token to the combination layer;
program instructions to transmit the user token and the user state to the SP;
program instructions to validate the user state and the user token at the SP;
program instructions to retrieve a user profile at the SP that corresponds to the user state; and
program instructions to grant access to the tenant resource at the SP.

16. The computer program product of claim 15, further comprising:
program instructions to request creation of a trust application configured with a security protocol at an IDP, by a combination layer; and
program instructions to receive at the combination layer verification of creation of the trust application at the IDP.

17. The computer program product of claim 15, further comprising:
program instructions to request creation of the trust application at the IDP by a combination layer;
program instructions to create the trust application at the IDP, configured to receive single sign-on authentication requests from the combination layer according to a security protocol; and
responsive to the successful creation of the trust application, program instructions to transmit confirmation of the trust application creation from the IDP to the combination layer; program instructions to create a tenant domain at a service provider, configured to accept authentication credentials according to the security protocol from the combination layer; and program instructions to configure the combination layer to redirect successfully authenticated single sign-on session from the IDP.

18. The computer program product of claim 17, wherein the security protocol of the single sign-on authentication request is Security Assertion Markup Language 2.0.

19. The computer program product of claim 17, wherein the security protocol of the single sign-on authentication request is OAuth 2.0.

20. The computer program product of claim 15, wherein the user's login request to access a tenant resource at the SP is from an application on a user's mobile device and the combination layer additionally acts as an Application Programming Interface between the IDP and the SP.

* * * * *